United States Patent [19]

do Rosario Sousa de Cabedo

[11] Patent Number: 5,547,205
[45] Date of Patent: Aug. 20, 1996

[54] LUGGAGE CART WITH ATTACHED SEAT

[76] Inventor: Maria do Rosario Sousa de Cabedo, 2337 E. Brookdale Pl., Fullerton, Calif. 92631

[21] Appl. No.: 396,263

[22] Filed: Feb. 28, 1995

Related U.S. Application Data

[63] Continuation-in-part of Ser. No. 193,417, Feb. 7, 1994, abandoned.

[30] Foreign Application Priority Data

Feb. 9, 1993 [BR] Brazil .................................. 7300209 U

[51] Int. Cl.⁶ ...................................................... B62B 3/10
[52] U.S. Cl. ........................ 280/30; 280/648; 280/47.34; 280/47.38; 297/14; 297/60; 297/250.1
[58] Field of Search ........................... 280/30, 657, 47.4, 280/47.38, 47.41, 79.2, 37, 250.1, 304.1, 47.34, 79.1, 79.3; 296/174; 297/14, 16.2, 59, 60, 256, 255, 256.17, 250.1, 16.1, 50, 46, 116, 139, 141

[56] References Cited

U.S. PATENT DOCUMENTS

| | | | |
|---|---|---|---|
| 1,692,930 | 11/1928 | Cummings | 297/14 |
| 1,869,365 | 8/1932 | Corduan | 297/60 |
| 2,257,211 | 9/1941 | Willoughby | 297/14 |
| 3,170,709 | 2/1965 | Shackel | 280/47.34 |
| 4,381,870 | 5/1983 | Muellner | 280/47.4 |
| 4,460,215 | 7/1984 | Chamberlain et al. | 297/14 |
| 5,161,811 | 11/1992 | Cheng | 280/30 |
| 5,213,360 | 5/1993 | Lin | 280/30 |
| 5,374,073 | 12/1994 | Hung-Hsin | 280/30 |

FOREIGN PATENT DOCUMENTS

| | | | |
|---|---|---|---|
| 0911173 | 4/1954 | Germany | 297/60 |

*Primary Examiner*—Anne Marie Boehler

[57] ABSTRACT

A wheeled luggage cart comprising a folding seat and a handle that, through a simple rotation by the user, releases said seat and rotates it down from a folded up compact stowed position to a horizontal level position for seating the traveler. The seat is attached to the cart by means of a hinge assembly that engages the vertical posts of the cart and permits rotation of the seat to the two positions; in the deployed seating position, dual legs extend downward from the center of the seat to the floor to support the user's weight. To position these legs correctly, a connection guide link, attached to the luggage cart, guides the legs to their correct load bearing position. In addition to support this load, there is a diagonal compression link attached to the seat, and attached to the base of the luggage cart, to provide a truss structure to share the imposed weight. A sliding bracket on the cart allows the diagonal link to be compactly stowed with the seat flatly against the back of the cart. The linkage provides a stable seat on which the user may sit, and provides additional foot heel space beneath the seat when the user is seated and accomodates sizeable unbalanced body weight without the cart rolling or enduring structural failure. The seat in the folded position does not inhibit or prevent multiple stacking of carts.

3 Claims, 3 Drawing Sheets

5,547,205

LUGGAGE CART WITH ATTACHED SEAT

This application is a Continuation-in-Part of U.S. application Ser. No. 08/193,417, filed Feb. 7, 1994, now abandoned.

BACKGROUND OF THE INVENTION (a) Field of the Invention

The present invention relates to a luggage cart and more particularly to the attachment of a seat to a cart that carries baggage, possessions and goods by travelers at airports as well as train, ship and bus terminals.

(b) Description of the Prior Art

Presently all train, bus, ship terminals and airports have available for the travelers' luggage, carts to help them convey their possessions about the terminals to ticket agents and various objectives while waiting for their transportation to arrive or leave. During these long waiting periods they are obliged to stand, sometimes without any place to rest during extended hours.

The present invention has arisen to mitigate and/or obviate the afore-described disadvantage of the present luggage cart.

SUMMARY OF THE INVENTION

The primary objective of the present invention is to provide suitable seating for the traveler while he is waiting for transportation with all his luggage, especially during common delays and cancellations, The present invention provides a four-wheeled luggage cart comprising a folding seat which the user, by simple rotation of the push handle on the luggage cart can release and rotate down said seat from a folded up compact stowed position on the back of a luggage cart to a horizontal level position for seating the traveler, thus this seat provides a ready resting place that solves the problem of fatigue of passengers obliged to stand for hours in lines near their luggage at airports and terminals, with the advantage that the cart can still be compactly stored and deployed, and the seat is attached with a hinge assembly that engages the vertical posts of the luggage cart and permits rotation of the seat to the vertical stowed and horizontal deployed positions, as the seat is rotated to the deployed seating position whereas dual leg means extend downwards from the center beneath the seat, bearing on the floor or ground and support the travelers' weight, thereof to position the dual stanchion legs a connection guide link attached to the luggage cart guides the leg means to their correct load bearing position, thereof to support this load there is a diagonal compression link attached to the seat that also accepts compression loads and conveys the load from the center of the seat to the base of the luggage cart, thereof both the vertical dual stanchion leg means and the diagonal links form a truss structure to share the weight imposed on the seat, thereof the diagonal link is attached to a sliding bracket that allows the diagonal link to be compactly stowed, thereof the connection guide link is attached to a stationary pivot at the base of the luggage cart that permits the link to rotate to the stowed and deployed seat positions for supporting the traveler or anything resting on the seat.

Further objectives and advantages of the present invention will become evident from a careful reading of the detailed description provided hereinbelow, with appropriate reference to the accompanying Drawings.

DETAILED DESCRIPTION OF THE INVENTION

Figure 1:
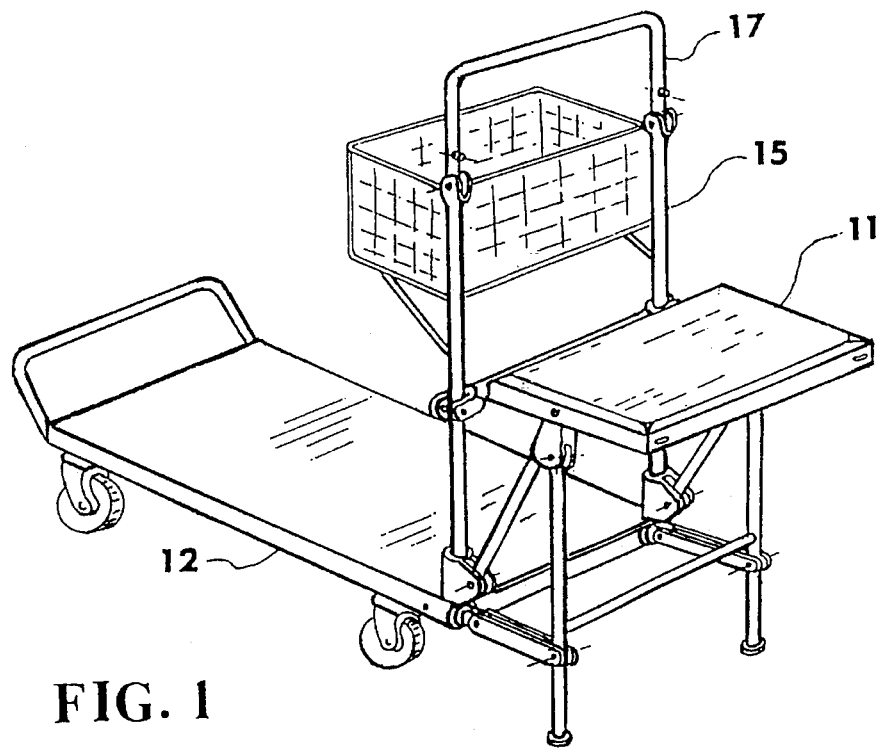
FIG. 1 is a perspective view of a luggage cart showing the present invention with the attached seat in a deployed rest position.
Figure 2:
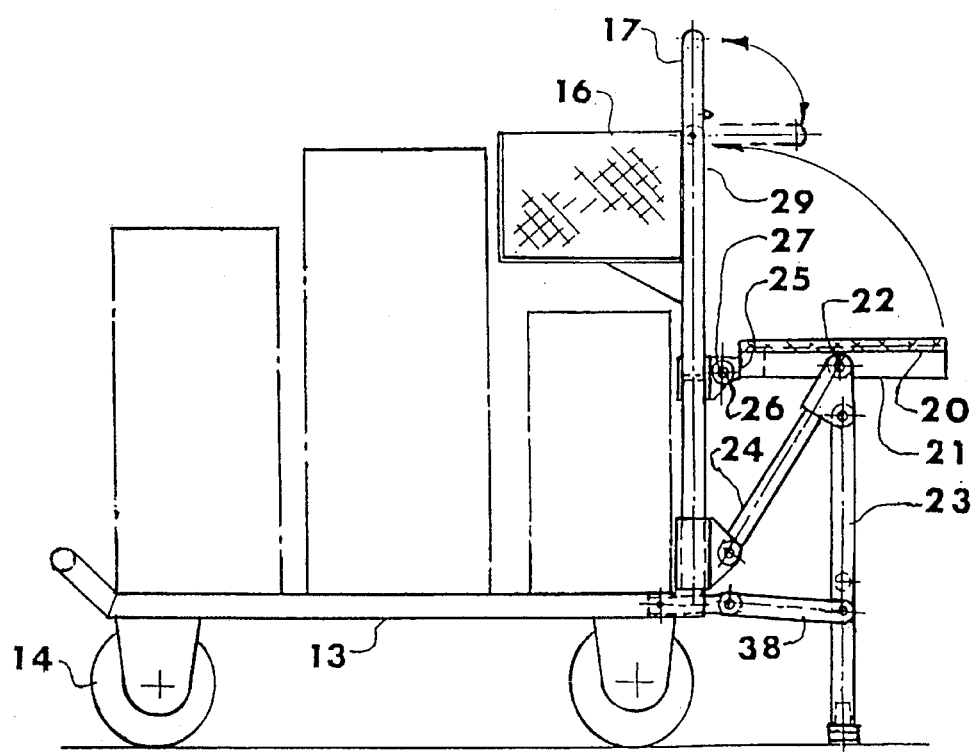
FIG. 2 shows a side view of the attached seat to a luggage cart in the deployed rest position.

Referring to the Drawings and initially to FIGS. 1 and 2, the invention comprises generally of a foldable seat assembly (11) that is installed on a three or four wheel luggage or equipment cart (12) that contains a base (13) with wheels (14) and a vertical tubular structure (15) that permits the wheeled assembly to be pushed or pulled containing luggage or possessions stacked upon its lower base (13). The tubular rear support structure (15) generally contains a basket (16) for insertion of small packages or possessions that might fall off of the base structure should they have been put on it. The tubular rear support structure (15) contains a handle (17) at its upper termination for ease of pushing or pulling by the user. Such a structure is different from the conventional cart because the handle can be positioned either horizontally or vertically as further described herein.

Figure 3A:
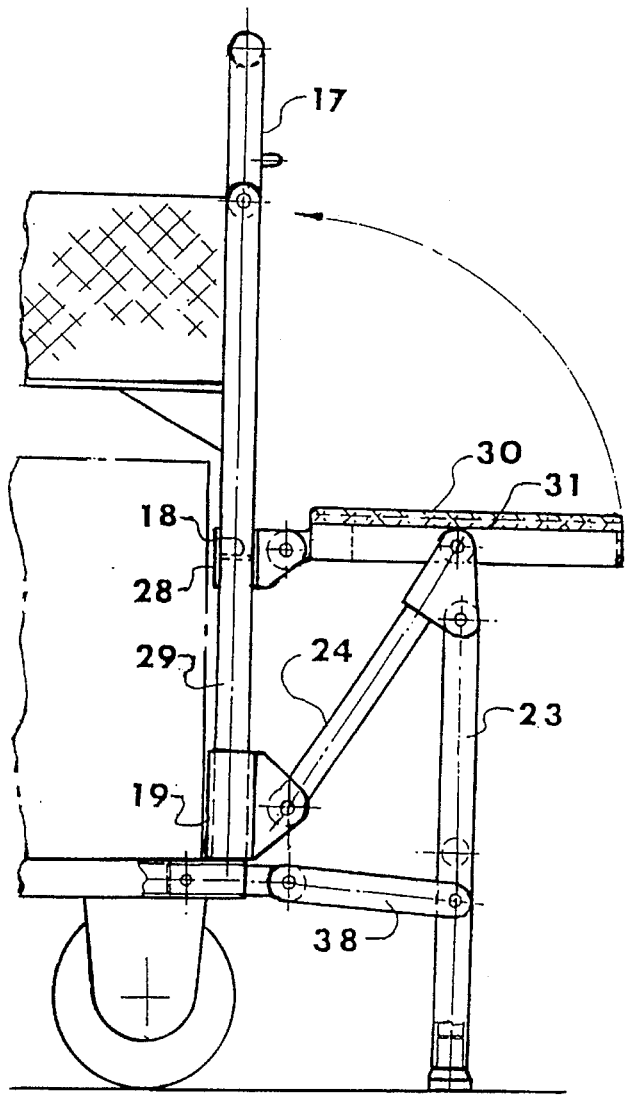
FIGS. 3a and 3b show a partial side view of the seat in its stowed and extended positions attached to the luggage cart.
Figure 3B:
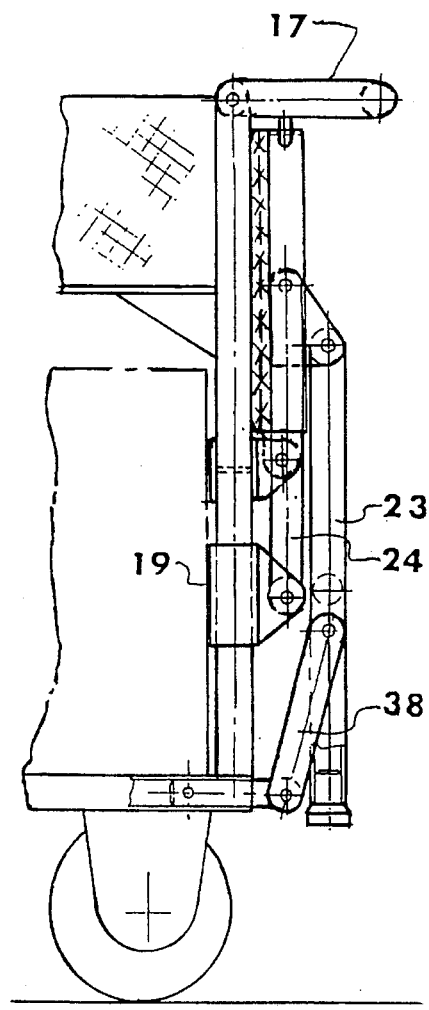
Figure 4:
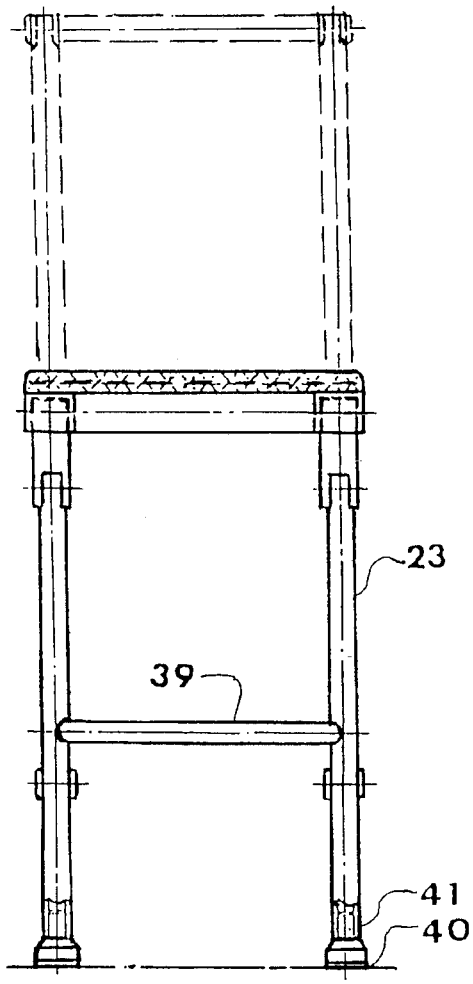
FIG. 4 shows a rear view of the attached seat to the luggage cart in a deployed rest position.
Figures 5, 6:
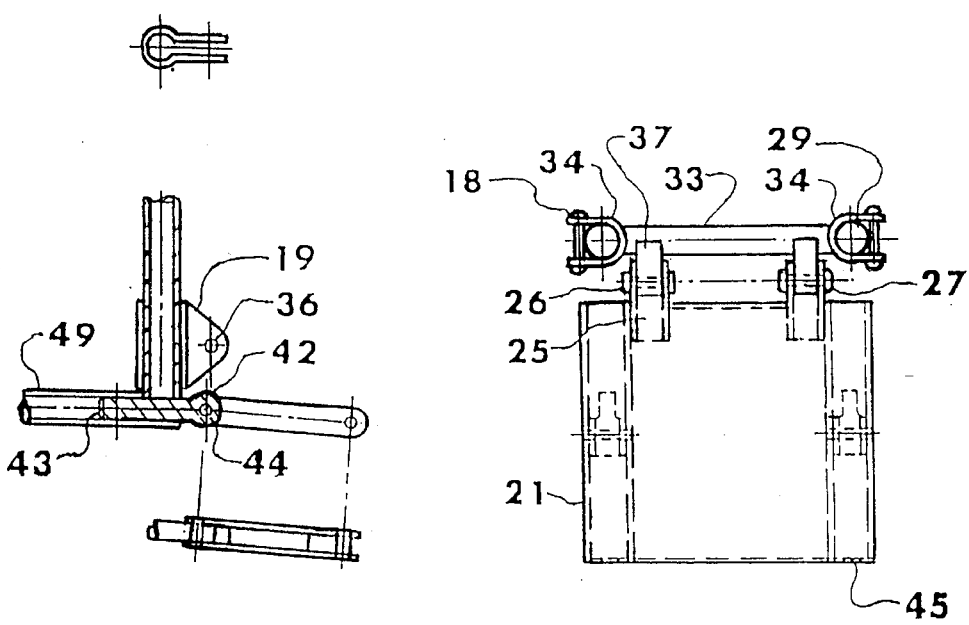
FIG. 5 shows a plan view of the seat and its attachment to the luggage cart.
FIG. 6 shows a side view detail of the connection of the guide link and the diagonal links to the luggage cart.

The present invention is characterized by a folding seat assembly (11) that is attached to the rear side of said luggage cart (12). The seat assembly comprises a base plate (20) stiffened on the lower side with two channels (21) that run fore and aft relative to the cart. Each of these two channels (21) at their midpoint, where the weight is centered, contains a pivot pin (22) that attaches the channels (21) to a vertical stanchion leg (23) and a diagonal compression link (24). The seat channels (21) at their forward end are attached to two hinge fittings or clamps (25) that provide a pivot point (26) for the seat in order that it may be rotated upward to a stowed position against the aft side of the luggage cart. Two hinge pins (27) attach the seat assembly to a corresponding hinge assembly (28) attached to the carts' vertical structural tubes (29). The seat assembly is comprised of the baseplate (30), cushion padding (31) and an outer cover that captures the cushion padding and provides a soft seat for the person who rests upon it. The hinge assembly (28) that is attached to the cart vertical tubular structure is attached to this structure with two bolts (18) that clamp the hinge tightly to the cart's vertical tubes. FIG. 5 shows a plan view of the seat assembly with the hinge assembly clamped to the cart's vertical tubes (29). The hinge assembly is comprised of a cross tube (33) that has two fixed "C" clamps (34) attached to each end. The "C" clamps straddle the cart's vertical tubes (29) and are clamped tightly around the tubes with a bolt (18), nut and washer that draw the flanges of the "C" clamp tightly against the cart's tubes and firmly position it for supporting the seat and providing a hinge point (26) for the seat rotation. The "C" clamp hinge can be easily and readily attached and removed from the cart's vertical tubes. The "C" clamp hinge cross tube (33) has two projecting arms (37) that engage the seats hinge fittings (25) and are coupled together with hinge pins (27) in line with each other. FIG. 5, in addition, shows the stiffening channels (21) that help to support the seats base plate and provide double shear support strength to the pins that attach the vertical stanchion (23) and the diagonal compression links (24). FIG. 3b shows the seat assembly rotated to the stowed position. FIG. 5 shows the seats stiffening channels in line with the cart's vertical tubes. When the seat is rotated to the stowed position, FIG. 3b, the diagonal links (24) nest into the seats channels (21) and as such can pass by the "C" clamps' projecting hinge arms and hinge pins. FIG. 4 shows the two vertical stanchions (23) that support the seat and the weight upon it in compression to the floor or ground. The two vertical stanchions are attached to each other with a cross bar (39) that keeps them parallel to each other, prevents them from separating under load and ensures that they will rotate together in the deployment and stowed positions and prevents them from deflecting outward under load. Each vertical stanchion contains at its lower termination a foot pad (40) and diametrical fitting (41) that slides into the open end of the vertical stanchions. The foot pads prevent the stanchions from slipping and sliding on the floor or ground when the seat is in the downward deployed position. They also close out the end of the stanchion tubes to prevent dirt and debris from entering or being contained in the open end of the stanchions. Referring to FIG. 2, the diagonal compression link (24) is attached to a fitting (19) that can slide up and down the cart's vertical tubular structure. In the deployed seated down position this fitting stops and bears against the horizontal tubular structure (49) on the cart. This permits the seat load to be transmitted directly into the cart's structure and in turn transmitted from the structure to the cart's aft wheels and then to the floor or ground. When the seat is rotated upward to the stowed position the diagonal link (24) rotates upward and forward as the seat is moved. This draws upward the sliding fitting (19) to a position shown in FIG. 3b. As there is no weight upon the seat in this position, the diagonal link with its sliding fitting and the vertical stanchions are not required to accept any load and position themselves tightly against the back of the luggage cart. FIG. 6 shows the sliding fitting (19) and how it is attached to the cart's vertical structural tube. The fitting is a split tube with two projecting flanges that provide pivot points (36) for the diagonal tube (24) attachment. The fitting is deflected open to engage the cart's support tube and then when the diagonal tube is attached to it, bolt (36) clamps up on the diagonal tube and captures the sliding fitting around the cart's structural tube. The bolt provides both retention and rotation capability. The folding seat is manually rotated to its folded stowed position and downwards to its "user ready" seated position. When the folding seat is in the stowed position, the push-pull handle (17) on the luggage cart is rotated down to a horizontal position for ease of guiding and moving the cart. In this down or locked position, the handle engages a slot in the seat frame (45) outer edge and ensures the seat cannot be inadvertently pulled down when the luggage cart is moving. When the seat is to be deployed, rotation of the handle (17) upward to a vertically locked up position provides headroom for the user when seated, disengages a projecting locking pin on the lower side of the handle from the slot in the folded up seat. Once disengaged or unlocked, the seat can be readily rotated down to a user seated position (shown in FIG. 3a). FIGS. 1, 2 and 6 illustrate how the guide links (38) are attached to the cart structure and to the stanchion tubes. The two guide links are channels that have flanges that straddle the stanchion tube at one end and straddles a diametrical bar fitting (42) slides into the inside of the cart's horizontal tubular structure, FIG. 6, and is retained in the tube with a single bolt (43) or pin that captures it from sliding out of the cart's structural tube. The bar fitting provides the pivot (44) for the guide link that guides the seat linkage as it rotates from stowed position, to seated down position, to stowed position again. The invention's linkage arrangement provides a stable seat on which the user may sit and provides additional foot heel space beneath the seat when the user is seated, provides for unbalanced seating loads and can accommodate seizable body weight without structural failure.

As various possible embodiments might be made of the above invention without departing from the scope of the invention, it is to be understood that all matter herein described or shown in accompanying Drawings is to be interpreted as illustrative and not in a limiting sense. Thus, it will be appreciated that the Drawings are exemplary of a preferred embodiment of the invention.

I claim:

1. A folding seat pivotally attached by an interconnecting linkage to a four-wheeled luggage cart comprising:

a) a vertical stanchion that pivotally connects to the center of two channels on the lower side of the seat and supports vertical loads on the seat in compression directly to the floor;

b) a diagonal link that connects to the center of the seat and shares the vertical loads and transmits the loads downward into said luggage cart to which it is attached;

c) a guide link that guides the interconnecting linkage to a folded up stowed position and to a deployed seated position and in the deployed position completes a triangular support for acceptance of the induced loads; and d) a sliding fitting pivotally connects the diagonal link to the cart at a pivot point and transmits loads directly into said luggage cart at this position, and is permitted to slide upward on the cart to the folded stowed position when the distance between the pivot point and the pivotal connection of the seat to the cart is shortened.

2. A four-wheel luggage cart and folding seat assembly, comprising:

a) a removable hinge clamp assembly that engages and supports a seat, installed between two vertical tubes on the cart when the hinge clamp in clamped tightly, and provides hinge points for the seat to pivot between a deployed and a folded position;

b) the seat assembly has a base plate supported by two channels for stiffness and permits a supporting linkage to be nested internally in the channels when the seat is in the folded position; and c) a handle on the luggage cart that can be rotated from a horizontal position, when the handle is used for pushing or pulling the cart, to a vertical position to provide headroom for the seated user, and the rotation of the handle to the horizontal position actuates a lock means that locks the seat in the folded position to prevent it from moving or folding downward; rotation of the handle to the vertical position permits the seat to be deployed from the folded stowed position to the deployed position.

3. A luggage cart as described in claim 2, also comprising:

a) a hinge assembly that is comprised of a cross tube that has two C clamps attached to each end, and clamp to the cart's vertical tubes, and provide attachment pivots for the folding seat;

b) a sliding fitting that clamps around the luggage cart's vertical tubes, and provides attachment points for diagonal compression links; and c) a bar that is inserted into and bolted to the luggage cart's base structural tube, and projects aft to permit attachment of a guide link that, upon rotation, extends the seat's vertical stanchion tubes and retracts them in the folding position.

* * * * *